US007942588B2

(12) United States Patent
Durand et al.

(10) Patent No.: US 7,942,588 B2
(45) Date of Patent: May 17, 2011

(54) HYBRID MULTI-CONTACT CONNECTOR

(75) Inventors: Renaud Durand, Eybens (FR); Charles Populaire, Grenoble (FR)

(73) Assignee: Radiall, Rosny-Sous-Bois (FR)

( * ) Notice: Subject to any disclaimer, the term of this patent is extended or adjusted under 35 U.S.C. 154(b) by 0 days.

(21) Appl. No.: 12/423,544

(22) Filed: Apr. 14, 2009

(65) Prior Publication Data

US 2009/0269013 A1 Oct. 29, 2009

(30) Foreign Application Priority Data

Apr. 24, 2008 (FR) ..................................... 08 52757

(51) Int. Cl.
*G02B 6/36* (2006.01)

(52) U.S. Cl. ................. 385/77; 385/71; 385/73; 385/75

(58) Field of Classification Search .................... 385/53, 385/71, 73, 75, 77

See application file for complete search history.

(56) References Cited

U.S. PATENT DOCUMENTS

| | | | | | |
|---|---|---|---|---|---|
| 4,781,623 | A | * | 11/1988 | Philippson et al. | 439/670 |
| 4,840,451 | A | * | 6/1989 | Sampson et al. | 385/89 |
| 5,417,590 | A | * | 5/1995 | Dechelette et al. | 439/607.48 |
| 5,718,605 | A | * | 2/1998 | Morikawa et al. | 439/607.27 |
| 5,791,939 | A | | 8/1998 | Tanigawa | |
| 6,217,230 | B1 | * | 4/2001 | Matsushita | 385/78 |
| 6,579,014 | B2 | * | 6/2003 | Melton et al. | 385/76 |
| 6,666,719 | B1 | * | 12/2003 | Kuroi et al. | 439/607.19 |
| 6,719,461 | B2 | | 4/2004 | Cull | |
| 6,783,283 | B2 | * | 8/2004 | Nishita | 385/92 |
| 6,874,946 | B2 | | 4/2005 | Cull | |
| 6,874,953 | B2 | * | 4/2005 | Dair et al. | 385/92 |
| 7,520,678 | B2 | * | 4/2009 | Khemakhem et al. | 385/75 |
| 7,547,149 | B2 | * | 6/2009 | Ice | 385/88 |
| 7,614,797 | B2 | * | 11/2009 | Lu et al. | 385/53 |
| 2002/0136501 | A1 | * | 9/2002 | Yen et al. | 385/88 |
| 2003/0194188 | A1 | * | 10/2003 | Shiino et al. | 385/53 |
| 2007/0036489 | A1 | | 2/2007 | Grzegorzewska et al. | |

FOREIGN PATENT DOCUMENTS

| | | | |
|---|---|---|---|
| DE | 10 2006 016 057 | A1 | 1/2007 |
| EP | 0 237 383 | A2 | 9/1987 |
| EP | 0 752 737 | A2 | 1/1997 |

* cited by examiner

*Primary Examiner* — Daniel Petkovsek
(74) *Attorney, Agent, or Firm* — Oliff & Berridge, PLC

(57) ABSTRACT

The present invention relates to a multi-contact connector comprising:

a plug constituting the termination of a cable having at least one optical conductor and/or at least one electrical conductor; and a socket for connecting to the plug and comprising a body and a plate for fastening to a panel;

wherein the socket is a single piece of polymer material and wherein the connector includes electromagnetic shielding.

11 Claims, 2 Drawing Sheets

HYBRID MULTI-CONTACT CONNECTOR

This non provisional application claims the benefit of French Application No. 08 52757 filed on Apr. 24, 2008.

FIELD OF THE INVENTION

The present invention relates to a multi-contact connector, in particular a connector including at least one optical path and/or at least one electrical path.

BACKGROUND OF THE INVENTION

Such a connector is commonly referred to as a "hybrid" connector. Such hybrid connectors are used for example to connect base stations to RRU/RRH (remote radio unit/remote radio head) transmitter modules for the wireless communications market. The advantage of this type of connector lies in the fact that they enable information to pass between the base and the module(s) via optical connections while also electrically powering the same modules via the electrical connections made of copper. The absence of interference between the optical signal and the electrical signal enables these two functions to be combined within a single connector. It is thus possible to use a single cable instead of the two usually used, thereby achieving a non-negligible space saving.

Examples of hybrid connectors for the telecommunications market already exist in the prior art, such as those described in U.S. Pat. Nos. 6,719,461 and 6,874,946.

Nevertheless, those connectors present a large number of parts and their relatively high manufacturing cost is a brake for that type of market.

OBJECT AND SUMMARY OF THE INVENTION

There thus exists a need to further improve connectors of that type, in particular in order to benefit from connectors that are simple in design, simple to assemble, with a small number of components, light in weight, and that provide the protection against lightning that is needed for an outdoor type application.

The invention seeks to satisfy these needs, and achieves this by a multi-contact connector comprising:

- a plug constituting the termination of a cable having at least one optical conductor and/or at least one electrical conductor; and
- a socket designed to be connected to the plug;
- wherein the socket includes a body made of polymer material and wherein the connector includes electromagnetic shielding.

The invention makes it possible to obtain a multi-contact connector that is compact, lightweight, and that presents electromagnetic shielding. Advantageously, the plug includes a metal or metal-plated sleeve and a plug grounding element mounted on the front face of the sleeve, in particular screwed thereto, the socket advantageously including a socket grounding element, and the electromagnetic shielding advantageously being provided by ground continuity between the sleeve, the plug grounding element, and the socket grounding element, when the plug is connected to the socket. The socket may include a plate for fastening to a panel, in particular a metal panel. The grounding element of the socket is also inserted to bear against the external metal plate during installation.

The socket is advantageously a single piece.

The socket body may have a tubular portion.

The socket grounding element advantageously comes into contact with the plug grounding element.

The plug grounding element advantageously presents a tubular shape, e.g. completely surrounding the insulating body.

The cable includes at least one optical conductor and/or at least one electrical conductor.

In exemplary embodiments of the invention, the cable has two electrical conductors and two optical conductors.

At its end for coming into contact with the socket, the plug includes an insulating body that is received in the sleeve and that has a front face presenting at least one portion in relief and advantageously at least one first portion in relief and at least one second portion in relief.

The term "front face of the insulating body" is used to designate the face of the insulating body into which contact-receiving cavities open out. The socket body has a front face presenting at least one first portion in relief and at least one second portion in relief.

The term "front face of the socket body" is used to designate the face of the socket body that comes into contact with the insulating body when the plug is connected to the socket.

The socket grounding element advantageously presents a tubular shape including at least one slot beside at least one solid portion.

The portion in relief of the front face of the socket body, and in particular the first portion in relief, is constituted for example by an opening allowing the solid portion of the socket grounding element to pass through the front face of the socket body.

The first portion in relief of the front face of the insulating body of the plug and the slot of the socket grounding element are advantageously of complementary shape so as to enable the portion in relief of the front face of the insulating body of the plug, in particular the first portion in relief, to be inserted in the slot of the socket grounding element when connecting the plug to the socket.

The first portion in relief of the front face of the insulating body of the plug and the slot of the socket grounding element advantageously constitute means for providing keying between the plug and the socket.

The second portion in relief of the front face of the insulating body of the plug is constituted, for example, by a setback, and the second portion in relief of the front face of the socket body is constituted, for example, by a forwardly-projecting element, the second portion in relief of the front face of the insulating body of the plug and the second portion in relief of the front face of the socket body advantageously presenting complementary shapes so as to co-operate when the plug is being fastened to the socket.

Advantageously, the invention makes it possible to obtain guide means between the plug and the socket, once keying has been achieved.

When the insulating body of the plug presents only one portion in relief, it is this one portion in relief that performs both the keying function and the guidance function.

The insulating body of the plug and the sleeve may present shoulders to prevent turning movement between these two parts, which may enable twisting of the cable to be avoided during handling.

The plug advantageously includes insulating elements, e.g. of comb shape, that are arranged to hold the electrical and/or optical contacts against the insulating body.

The socket advantageously includes insulating elements, e.g. of comb shape, that are arranged to maintain the electrical and/or optical contacts against the socket body.

These elements present openings to enable the contacts to pass through.

Insulating elements of such a shape may serve to facilitate assembly.

The socket body is advantageously made as a single piece of polymer material, e.g. selected from PAAs (polyaryl-amines), PAIs (polyamide-imides), PPSs (polyphenylene sulfides), and PESs (polyether sulfones), thereby enabling significant savings in cost and weight.

The socket body is advantageously made of a plastics material filled with metal fibers.

BRIEF DESCRIPTION OF THE DRAWINGS

Other advantages and characteristics of the invention appear on reading the following description of a non-limiting embodiment given with reference to the accompanying drawings, in which.

MORE DETAILED DESCRIPTION

Below, the connector has two optical contacts and two electrical contacts, but it would not go beyond the ambit of the present invention for its contacts to be different, for example the number of contacts could be different or the number of electrical contacts need not be the same as the number of optical contacts, or indeed the contacts could be optical only or electrical only.

Figure 1:
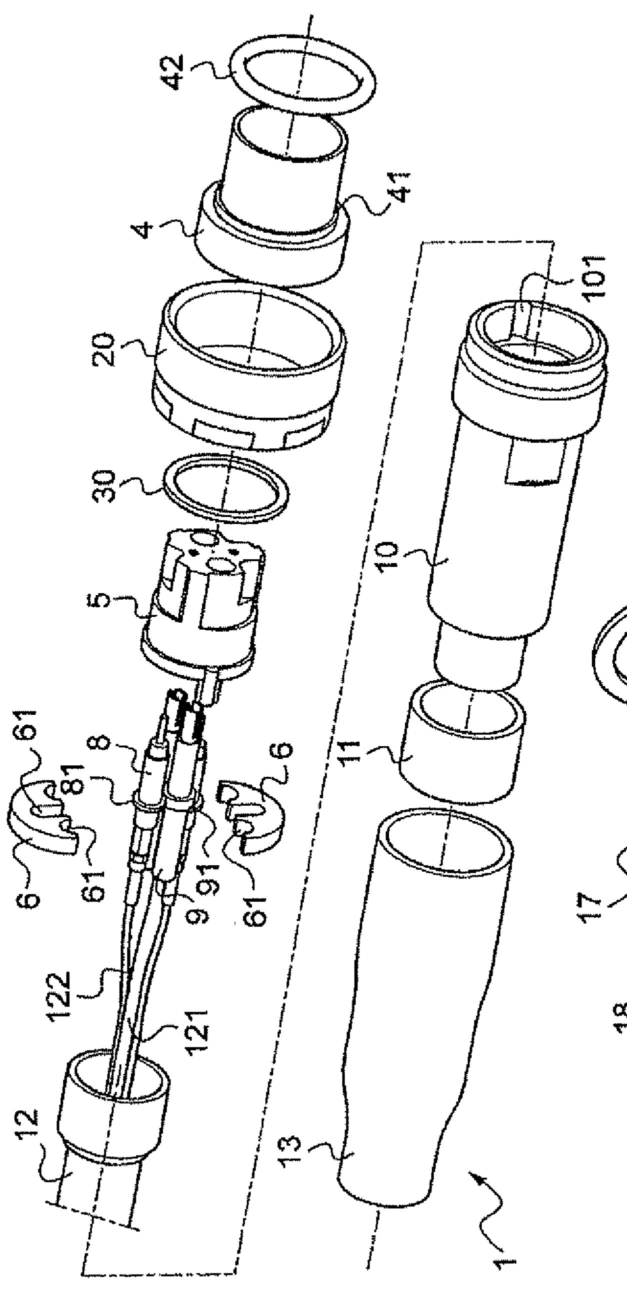
FIG. 1 is an exploded view of an example of a plug of the invention.

FIG. 1 shows an example of a plug of the invention given overall reference 1.

In the example described, the plug 1 constitutes the termination of a hybrid cable 12 having two electrical conductors 121 and two optical conductors 122.

In the example described, the optical conductors are optical fibers 122 that are mounted via a guide sleeve on an optical contact 8 that includes a shoulder 81 for performing a function described below. The guide sleeve serves to achieve accurate alignment between the optical contacts of the plug and the optical contacts of the socket. The optical contacts 8 may be of the angled polished connector (APC) type or of the polished connector (PC) type, using monomode or multimode optical fibers.

By way of example the electrical conductors are electric cables 121, e.g. made of copper, that are soldered or crimped to electrical contacts that are constituted in the example described by metal bushings 9 each having a shoulder 91 to perform a function that is described below.

The connector also has a metal or metal-plated sleeve 10, a crimping ferrule 11, and a pre-shaped sheath 13.

The pre-shaped sheath 13 covers the end of the cable 12, the ferrule, and a portion of the sleeve 10, and it serves to limit the possibility of the plug 1 turning relative to the cable 12.

Figures 3, 4, 5, 6:
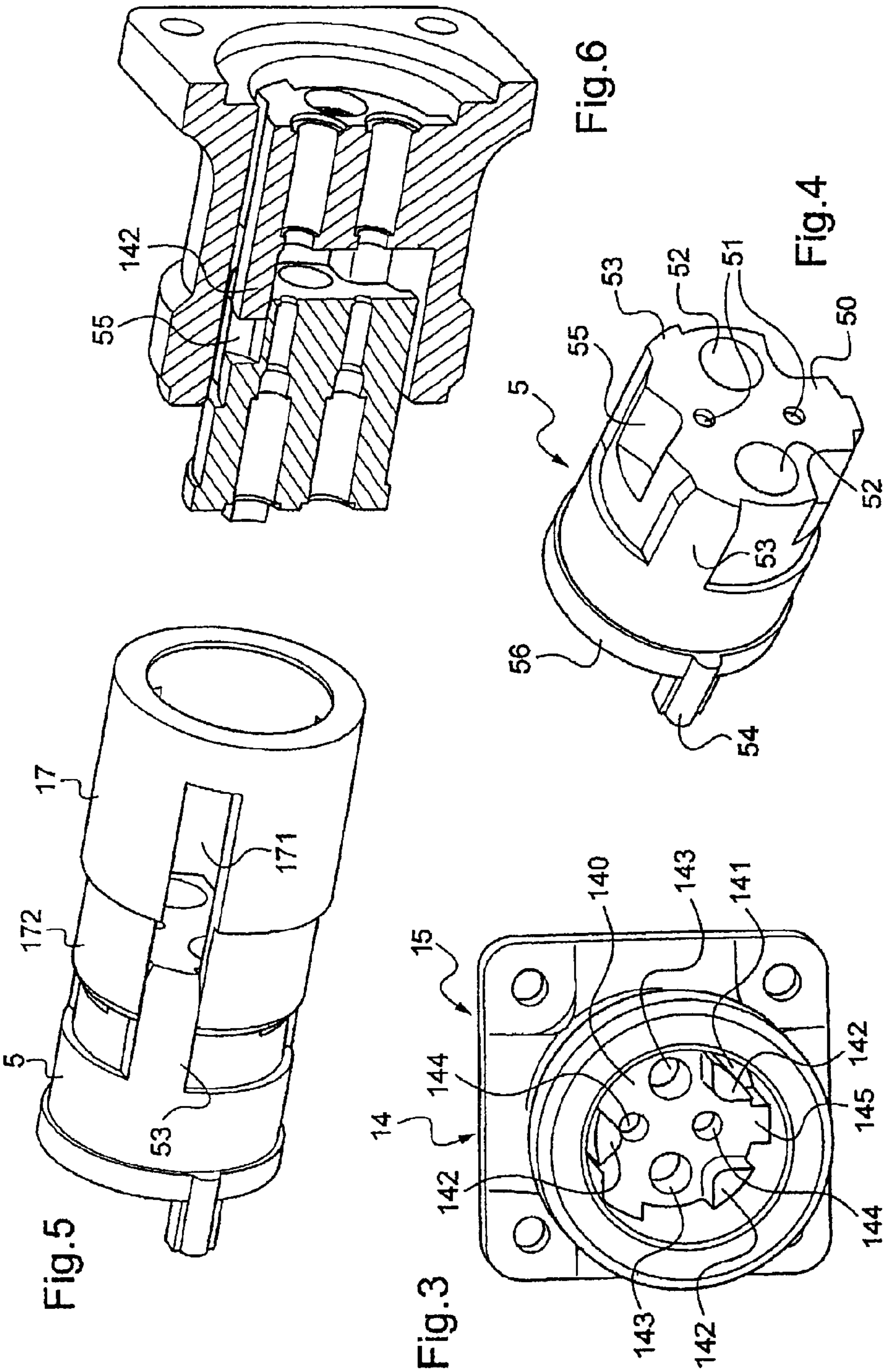
FIG. 3 is an isolated view of the insulating body shown in FIG. 1.
FIG. 4 is an isolated view of the socket body shown in FIG. 2.
FIGS. 5 and 6 are diagrammatic views showing steps in connecting the plug to the socket.

The plug 1 also has an insulating body given overall reference 5 and shown in FIG. 4.

In the example described, the insulating body has four cavities 51 and 52. By way of example, the cavities 52 are associated with the electrical contacts 9, while the cavities 51 are associated with the optical contacts 8, for example. In the example described, the insulating body 5 has a front face 50 that presents first and second portions in relief 53 and 55.

In the example described, the insulating body has three first portions in relief 53 distributed regularly around the periphery of the front face 50 of the insulating body 5.

The insulating body 5 also has a tab 54 extending axially from the rear face 56 of the insulating body 5 and arranged to co-operate with a portion in relief 101 of the sleeve 10.

The electrical contacts 9 and the optical contacts 8 are mounted in the insulating body 5 via its rear face 56, which face includes portions in relief (not shown) for receiving the shoulders 81 and 91 in order to limit the possibility of axial movement of the optical or electrical contacts once they have been mounted in the insulating body 5.

The plug also has insulating elements 6, e.g. in the form of combs that are assembled on either side of the contacts. The elements 6 present openings 61 through which the contacts 8 and 9 pass when the elements are mounted together in pairs.

The elements 6 serve to limit the possibility of axial displacement for the optical or electrical contacts when they are mounted thereon.

In the example described, the insulating body 5 is mounted via its rear face 56 in the sleeve 10. The tabs 54 and the portion in relief 101 of the sleeve co-operate, e.g. in such a manner as to constitute shoulders so as to prevent the insulating body 5 from turning relative to the sleeve 10, which may serve to avoid the cable 12 being twisted.

The plug also includes a flat gasket 30 and a ring 20 mounted on the sleeve 10. By way of example, the ring is made of polymer material or of metal alloy of the brass type.

The plug also has an element 4 for grounding the plug, and in the example described this element is screwed onto the sleeve and may serve to hold the insulating body 5 in the sleeve 10. The grounding element 4 includes a housing 41 for receiving a gasket 42.

The plug of the invention is found to be particularly simple to assemble and the grounding element 4 and the insulating body 5 may easily be disassembled for the purpose of cleaning the optical fibers 122 without uncrimping the cable 12.

Figure 2:
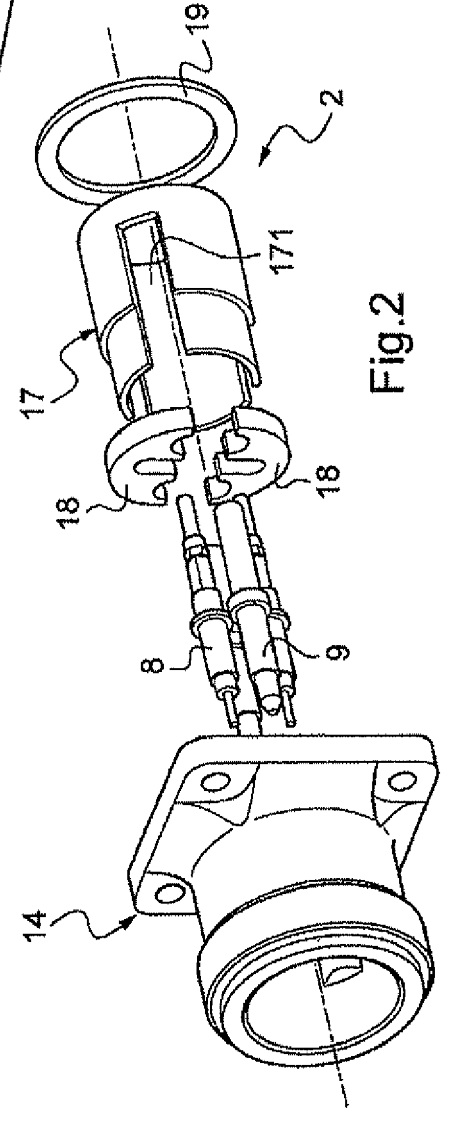
FIG. 2 is an exploded view of an example of a socket of the invention.

There follows a description with reference to FIG. 2 of an example of a socket of the invention that is given overall reference 2. The socket 2 includes a socket body 14 having a tubular portion and a plate 15 for fastening to a panel (not shown), as shown in FIG. 3.

The socket body 14 is made of polymer material and it may be constituted by a single piece or by an assembly of pieces. By way of example, the socket body 14 is made of PAA (polyaryl-amine), PAI (polyamide-imide), PPS (polyphenylene sulfide), or PES (polyether sulfone).

By way of example, the socket body has two first through cavities 143 and two second through cavities 144.

The first cavities 143 serve to pass electrical contacts and the second cavities 144 serve to pass optical contacts.

In the example described, the socket body 14 also has first and second portions in relief 141 and 142.

In the example described, the first portions in relief 141 comprise three openings disposed regularly around the periphery of a front face 140 of the socket body 14, defining between them in pairs three solid portions 145.

The second portions in relief 142 are portions that project forwards from the front face 140.

The rear face of the socket body has portions in relief (not shown) that serve to receive the shoulders 81 and 91 of optical and electrical contacts 8 and 9 in similar manner to that described with reference to the plug 1.

The socket also has insulating elements 18, e.g. in the form of combs that are assembled on either side of the electrical and optical contacts, similarly to the elements 6 described with reference to the plug 1.

The socket includes a socket grounding element 17 that is tubular in shape in the example described. This socket grounding element 17 includes, for example, three slots 171 distributed regularly around its periphery and defining between them in pairs solid portions 172. By way of example, the slots extend axially over less than the length of the element 17.

By way of example, the solid portions 172 are arranged so as to be capable of being inserted in the openings 141 when assembling the grounding element 17 on the socket body 17, and the slots 171 may be arranged to receive the solid portions 145 of the front face during said assembly.

By way of example, the length of the grounding element 17 is selected so that the grounding element 17 of the socket extends forwards beyond the front face 140 of the socket body after it has been assembled on the socket body 14.

The socket grounding element 17 may present an internal shoulder (not shown) serving to block the insulating element 18 axially while it is being assembled on the socket body 14.

The socket 2 also includes a gasket 19 for mounting on the socket grounding element 17.

Once the socket has been mounted on a utilization site, the socket grounding element bears against a metal panel (not shown).

FIGS. 5 and 6 show an example of a plug 1 as described above being connected to a socket 2 as described above.

The plug 1 may be connected to the socket 2 in three stages. The first stage consists in centering the plug 1 in the socket 2 by co-operation between the plug grounding elements 4 and the socket body 14.

The second stage consists in keying the plug 1 by means of the socket grounding element 17. During this stage, each first portion in relief 53 is inserted in a slot 171, as shown in FIG. 5. The third stage corresponds to final guidance between the socket 2 and the insulating body 5. During this stage, each second portion in relief 142 is inserted in a second portion in relief 55 of the insulating body 5, as shown in FIG. 6.

Once the connection has been made, the grounding element 4 of the plug 1 bears against the grounding element 17 of the socket 2, and the grounding element 17 of the socket 2 bears against the above-mentioned panel, thereby enabling ground continuity to be obtained for shielding the connector made in this way.

The gasket 42 serves to provide sealing between the plug 1 and the socket 2, and the gasket 19 serves to provide sealing between the socket 2 and the panel.

The invention is not limited to the examples described above.

In another example (not shown), the front face 50 of the insulating body 5 has only one type of portion in relief that performs both the keying function and the final guidance function.

In the claims, the term “comprising a” should be understood as being synonymous with the term “comprising at least one”, unless specified to the contrary.

Although the present invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A multi-contact connector comprising:

a plug constituting the termination of a cable having at least one optical conductor and/or at least one electrical conductor; and a socket for connecting to the plug and comprising a body and a plate, the plate configured to be fastened to a panel, wherein the socket is a single piece of polymer material, the multi-contact connector includes electromagnetic shielding, the plug comprises a metal or metal-plated sleeve and a plug grounding element mounted on the front of the sleeve, the socket comprises a socket grounding element capable of coming into contact with the plug grounding element, and the electromagnetic shielding is provided by ground continuity between the sleeve, the plug grounding element, and the socket grounding element.

2. A connector according to claim 1, wherein the plug comprises, at its end that is to come into contact with the socket, an insulating body received in the sleeve and having a front face presenting at least one portion in relief, and the socket body comprises a front face presenting at least one first portion in relief and at least one second portion in relief.

3. A connector according to claim 2, wherein the front face of the insulating body comprises at least one first portion in relief and at least one second portion in relief.

4. A connector according to claim 3, wherein the socket grounding element is tubular in shape having at least one slot beside at least one solid portion.

5. A connector according to claim 4, wherein the first portion in relief of the front face of the socket body is an opening enabling the solid portion of the socket grounding element to pass through the front face of the socket body.

6. A connector according to claim 5, wherein the first portion in relief of the front face of the insulating body of the plug and the slot of the grounding element of the socket are of complementary shape to enable the first portion in relief of the front face of the insulating body of the plug to be inserted in the slot of the socket grounding element when connecting the plug to the socket.

7. A connector according to claim 3, wherein the second portion in relief of the front face of the insulating body of the plug is a setback and wherein the second portion in relief of the front face of the socket body is a projecting element, and wherein the second portion in relief of the front face of the insulating body of the plug and the second portion in relief of the front face of the body of the socket presents complementary shapes so as to co-operate while connecting the plug to the socket.

8. A connector according to claim 2, wherein the insulating body and the sleeve presents shoulders for preventing turning movement between the insulating body and the sleeve.

9. A connector according to claim 1, wherein at least one of the plug and the socket comprises insulating elements arranged to hold electrical and/or optical contacts against the insulating body or the socket body.

10. A connector according to claim 1, wherein the polymer material of the socket body is selected from the group consisting of PAAs (polyaryl-amines), PAIs (polyamide-imides), PPSs (polyphenylene sulfides), and PESs (polyether sulfones).

11. A connector according to claim 1, wherein the socket is made of a plastics material filled with metal fibers.

* * * * *